United States Patent  [11] 3,611,919

| | | | | |
|---|---|---|---|---|
| [72] | Inventor | Gordon D. Thomas<br>Neenah, Wis. | 887,622 5/1908 Gay | 101/23 |
| [21] | Appl. No. | 785,508 | 3,188,948 6/1965 Fischer et al. | 101/221 X |
| [22] | Filed | Dec. 20, 1968 | | |
| [45] | Patented | Oct. 12, 1971 | | |
| [73] | Assignee | Kimberly-Clark Corporation<br>Neenah, Wis. | | |

Primary Examiner—William B. Penn
Assistant Examiner—E. M. Coven
Attorney—Wolfe, Hubbard, Leydig, Voit & Osann

[54] METHOD AND APPARATUS FOR MULTIPLE EMBOSSING OF CONTINUOUS WEBS
7 Claims, 3 Drawing Figs.

[52] U.S. Cl. .................................................. 101/23,
101/178, 101/221
[51] Int. Cl. ..................................................... B44b 5/00
[50] Field of Search .......................................... 101/22, 23,
32, 92, 178, 180, 181, 183, 221

[56] References Cited
UNITED STATES PATENTS
314,556 3/1885 Anthony ..................... 101/221 X ABSTRACT: A method and apparatus of forming two or more embossments repeated continuously along the length of a flexible web and out of register with each other. The embossments are formed by passing the web through two or more embossing stations on the surface of a single embossing roll, and drawing the web away from the surface of the embossing roll between successive embossing stations. The flexible web may be made of cellulosic tissue or other substantially nonresilient material, and reinforced with resilient threads or other elements extending continuously in the longitudinal direction of the web so as to maintain a constant web length between pairs of successive embossing stations. The resulting product is also disclosed.

PATENTED OCT 12 1971　　　　　　　　　　　　3,611,919

INVENTOR.
GORDON D. THOMAS,
BY Wolfe, Hubbard, Voit & Osann
ATTORNEYS.

METHOD AND APPARATUS FOR MULTIPLE EMBOSSING OF CONTINUOUS WEBS

The present invention relates generally to embossing methods and apparatus and, more particularly, to an improved method and apparatus for forming a flexible web having two or more embossments repeated continuously along the length of the web and out of register with each other, and the resulting product.

It is a primary object of the present invention to provide an improved embossing method and apparatus for forming two or more out-of-register embossments repetitively along the length of a flexible web by using a single embossing roll. A related object of the invention is to provide such an embossing method and apparatus in which the flexible web may be made of reinforced cellulosic tissue or other substantially nonresilient material.

Another object of the invention is to provide a flexible web which is made predominantly of cellulosic tissue or other substantially nonresilient material, and having two or more embossments repeated continuously along the length of the web and out of register with each other.

A further object of the invention is to provide an improved embossing method and apparatus of the type described above which provide an efficient means of embossing continuous webs at high production rates.

Still another object of the present invention is to provide an improved embossing method and apparatus of the foregoing type which are capable of providing a reinforced web of cellulosic tissue with relatively high bulk and texture using a relatively low embossing pressure. In this connection, a related object of the invention is to provide such an improved embossing method and apparatus which insures a relatively long operating life for the embossing equipment.

Other objects and advantages of the invention will become apparent from the following detailed description taken in connection with the accompanying drawings, in which.

Figure 1:
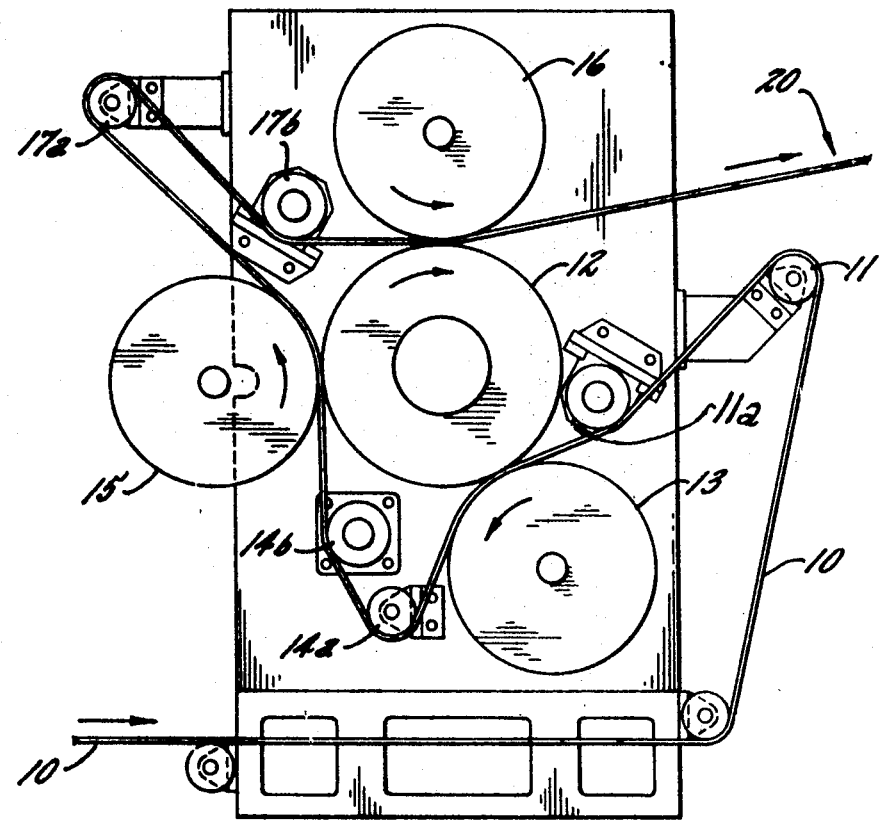
FIG. 1 is a partially schematic end elevation of an embossing method and apparatus embodying the invention.

While the invention is susceptible of various modifications and alternative forms, certain specific embodiments thereof have been shown by way of example in the drawings which will be described in detail herein. It should be understood, however, that it is not intended to limit the invention to the particular forms disclosed, but, on the contrary, the intention is to cover all modifications, equivalents, and alternatives falling within the spirit and scope of the invention.

Figure 2:
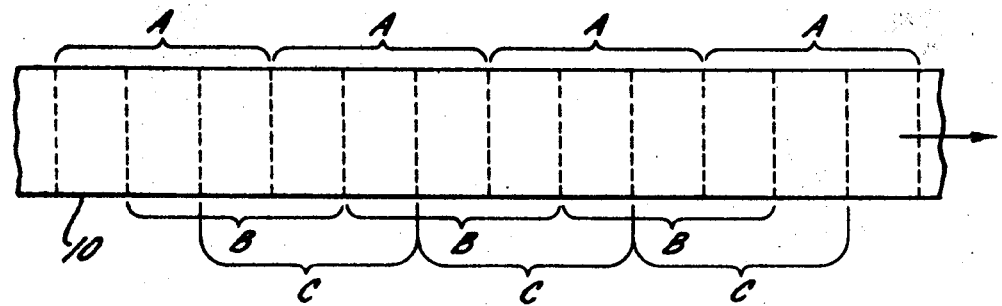
FIG. 2 is a schematic plan view of an embossed flexible web formed by the method and apparatus illustrated in FIG. 1.

Turning now to the drawings, and referring first to FIG. 1, a continuous web 10 of flexible material is drawn around an inlet roller 11 and continuously advanced under a guide roll 11a into engagement with a driven embossing roll 12 at a first embossing station where the web is pressed firmly against the surface of the embossing roll to form a first embossment in the web. More particularly, the web 10 is drawn through the nip formed by the metal embossing roll 12 and a first rubber roll 13 so as to form a first series of repetitive embossments along the length of the web 10. As can be seen in FIG. 1, the guide roll 11a is located to feed the web 10 into the nip of the rolls 12 and 13 along a common tangent line for the two rolls. The embossments formed at this first embossing station are illustrated schematically in FIG. 2 as embossments A repeated continuously along the length of the web 10. The repetition rate of the embossments A may be varied by a number of factors, including the diameter of the embossing roll 12 and the rate of repetition, if any, of the embossing pattern on the surface of the roll 12. For example, if the pattern of the embossing surface on the roll 12 repeats itself every 10 inches around the circumference of the roll 12, then the length of each embossment A illustrated in FIG. 2 will also be 10 inches, i.e., the embossments A will be repeated every 10 inches continuously along the length of the web 10.

In accordance with an important aspect of the present invention, the embossed web is continuously withdrawn from the first embossing station, drawn away from the surface of the embossing roll, and then passed through a second embossing station on the surface of the same embossing roll used to form the embossments at the first station. Thus, in the illustrative embodiment shown in FIG. 1, the embossed web 10 is continuously withdrawn from the nip of the rolls 12 and 13 and drawn away from the surface of the embossing roll 12 over a guide roll 14a. From the guide roll 14a, the embossed web is returned to the surface of the driven embossing roll 12 over a second guide roll 14b, and passed through a second embossing station formed by the nip of the metal embossing roll 12 and a second rubber roll 15. As can be seen in FIG. 1, the second guide roll 14b is located to feed the web 10 into the nip of the rolls 12 and 15 on a common tangent line for the two rolls. As the web is passed through the nip of the rolls 12 and 15, it is again pressed firmly against the surface of the roll 12 to form a second embossment in the web. These second embossments are illustrated schematically in FIG. 2 as embossments B repeated continuously along the length of the web 10, with the repetition rate being determined by the same factors discussed above in connection with the first embossments A.

It is important that the embossments formed at the second embossing station be out of register with the embossments formed at the first embossing station, so that the maximum area of the web is embossed, and to avoid overstressing any given portion of the web material. Consequently, if the embossing pattern on the surface of the metal roll 12 repeats itself around the circumference of the roll 12, the locations of the rubber rolls 13 and 15, the rate of advancement of the web 10, and the distance that the web 10 is drawn away from the surface of roll 12 by the guide rolls 14a and 14b must be selected so that the embossments formed at the successive embossing stations are out of register with each other. In one example of the illustrative embodiment, the embossing roll 12 has a diameter of 20 inches with an embossing pattern that repeats itself every 10 inches around the circumference of the roll; the embossing roll 12 is driven at a rate sufficient to provide a web speed of 500 feet per minute; the embossing stations are located at the angular positions shown in FIG. 1; and the centers of the guide rolls 14a and 14b are located 36 and 28 inches, respectively, from the center of the driven embossing roll 12.

It will be understood that any desired number of additional embossing stations may be provided around the circumference of the embossing roll 12, depending upon the characteristics desired in the final embossed web. Thus, in the illustrative embodiment, a third embossing station is provided by a third rubber roll 16 bearing against the outer surface of the roll 12. As the double-embossed web 10 emerges from the nip of the second rubber roll 15 and the embossing roll 12, the web is drawn outwardly away from the surface of the embossing roll 12 and over a guide roll 17a. From the guide roll 17a the double-embossed web is returned under a second guide roll 17b to the surface of the roll 12, and then passed through the third embossing station formed by the nip of the third rubber roll 16 and the metal embossing roll 12. As in the case of guide rolls 11a and 14b described previously, the second guide roll 17b is positioned so that the web 10 is fed into the nip of the rolls 16 and 12 on a common tangent line for the two rolls.

As the web is passed through the nip of the rolls 16 and 12, it is once again pressed firmly against the surface of the metal roll 12 to form a third embossment in the web. These third embossments are illustrated schematically in FIG. 2 as embossments C repeated continuously along the length of the web 10, with the repetition rate being determined by the same factors discussed above in connection with embossment A. It is again important that the embossments C be out of register with the embossments A and B, and in the particular example described previously the centers of the guide rolls 17a and 17b are located 63 and 32 inches, respectively, from the center of the embossing roll 12. The resulting triple-embossed web emerging from the nip of the rolls 16 and 12 is withdrawn from the embossing machine as at 20 for winding or further processing.

In order to maintain the rubber rollers 13, 15 and 16 at a temperature sufficiently low to prevent degradation of the rubber, the rollers are preferably water cooled. In general, it is desirable to prevent the temperature from rising above about 200° F. at any point in the rubber, which is generally in the form of a cover on the outer surface of a hollow metal drum. To facilitate cooling, the rubber cover is typically made as thin and hard as possible, consistent with good embossing performance.

In accordance with another important aspect of the present invention, the web to be embossed is made of paper or other substantially nonresilient material, and is reinforced in the longitudinal or machine direction by continuous threads or other reinforcing members made of a resilient material. It has been found that the nonresilient material is permanently stressed during the embossing operation, whereas the resilient reinforcing elements tend to spring back to their original dimensions and configuration as soon as the embossing pressure is released. Consequently, a substantially constant web length is maintained between successive embossing stations. Without the resilient reinforcing elements extending continuously in the machine direction in the web, the web continuously acquires a permanent stretch at each embossing station, so that the web length between each pair of successive embossing stations gradually increases.

In accordance with one specific aspect of the present invention, the embossed web comprises a pair of flexible layers of cellulosic tissue, and an open mesh, nonwoven web of crossed threads interposed between the layers of cellulosic tissue, with at least the warp threads of the crossed-thread web being made of a resilient material. Thus, it has been found the the embossing method and apparatus provided by this invention are particularly suitable for embossing the type of web shown in FIG. 3. More specifically, the web 30 in FIG. 3 includes two layers 31 and 32 of nonwoven cellulosic tissue or wadding with a nonwoven fabric 33 of crossed threads 34 and 35 interposed and adhesively bonded between the layers 31 and 32. In the preferred embodiment, each layer 31 and 32 is formed of two plys 31a, 31b and 32a, 32b, respectively, of creped cellulosic tissue. The cellulosic tissue preferably has a dry basis weight before creping of from about four to about 12 pounds per 2,800 square foot ream, with a crepe ratio before stretching and pressing of from about 1.1 to about 2.5 as it is creped off the dryer of the paper machine. The creped tissue is typically stretched and pressed after creping to reduce the original high crepe ratio to about 1.1 to 1.8 in order to produce a soft sheet such as is customarily used in the manufacture of facial tissue.

In the central layer 33 of nonwoven fabric, the fill threads 35, i.e., the threads which extend in the transverse direction, are all on the same side of the warp threads 34, i.e., the threads which extend in the longitudinal or machine direction, with the two sets of threads disposed in face-to-face relation to each other and adhesively bonded together where the threads of one set cross the threads of the other set. For the purposes of the present invention, it is preferred that the crossed-thread fabric have a relatively low thread count, e.g., two to three threads per inch in both directions to provide a relatively high bulk in the final embossed product. The threads in each of the two cross-laid sets normally run parallel to each other and are uniformly spaced. The adhesive is normally applied to both sets of threads in order to achieve the most effective bonding of the nonwoven fabric 33 to the outside layers 31 and 32 of cellulosic tissue, although adhesive may be applied to only one of the two sets of threads if desired. It will be understood that the term "threads" is intended to include both monofilament and multifilament structures, although multifilament structures are generally preferred in nonwoven fabrics of this type.

Figure 3:
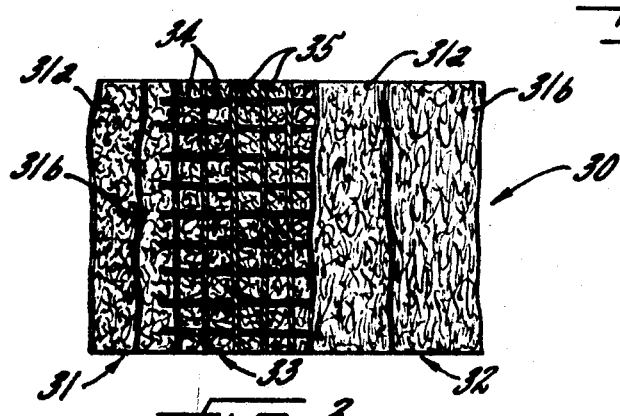
FIG. 3 is a schematic plan view of a reinforced paper web for use in the embossing method and apparatus illustrated in FIG. 1.

Nonwoven laminates of the type illustrated in FIG. 3 are known per se in the art, as exemplified by U.S. Pat. No. 3,072,511 to K. J. Harwood. When a web of such material is to be embossed by the method and apparatus of the present invention, it is important that at least the warp threads 34 be made of a resilient material, such as 40 denier high tenacity nylon or comparable polyester or rayon, for example. Whereas the cellulosic tissue layers 31 and 32 are permanently stressed during the embossing operation, to provide the resulting embossed laminate with the desired bulk and texture, the resilient warp threads 34 are only temporarily distorted during the embossing operation, and tend to spring back to their original configuration as soon as the embossing pressure is released. Thus, the resilient reinforcing warp threads 34 prevent any permanent elongation of the laminated web at any given embossing station, so that a substantially constant web length is maintained between successive embossing stations.

One of the significant advantages of the present invention is that the flexible web may be embossed to any desired degree by using a single embossing roll, and yet the embossing pressure required at each embossing station may be sufficiently low to provide a long operating life for the embossing equipment, particularly the rolls 13, 15 and 16 which are conventionally made of rubber, and which cooperate with the metal embossing roll to form the embossing stations. For example, if the same degree of embossing attainable with the three-station arrangement shown in FIG. 1 were to be achieved with a single embossing station, the embossing pressure required would be so great that the risk of failure of the rubber roll from heat buildup would render the operation unfeasible. Furthermore, supplemental operations such as pin embossing and the like are not necessary to improve the response of the flexible web to the main embossing operation, because the desired yieldability, bulk, and embossing response is improved in each subsequent embossing station, and it is simply a matter of providing the necessary number of such stations around the single embossing roll.

I claim as my invention:

1. A web-embossing method comprising the steps of passing a flexible web through two or more embossing stations spaced around a single rigid metal embossing roll with the web being pressed continuously against the embossing surface of said roll at each of said stations to form repetitive superimposed continuous embossments in the web at each station, said web comprising a material including at least two layers of cellulosic tissue which is stretchable and nonresilient at the pressures applied thereto at said embossing stations and an open-mesh web of crossed threads interposed between the layers of cellulosic tissue with at least the machine direction threads in the crossed-thread web being made of a material which is resilient at the pressures applied thereto at said embossing stations so that a substantially constant web length is maintained between each pair of successive embossing stations, and drawing the web away from the surface of said embossing roll between each pair of successive embossing stations so that the repetitive embossments formed in said web at each pair of successive embossing stations are offset from each other.

2. A web-embossing method as set forth in claim 1 wherein the thread count of said machine direction threads is between about two or three threads per inch.

3. A web-embossing method comprising the steps of passing a flexible web through two or more embossing stations spaced around a single rigid metal embossing roll with the web being pressed continuously against the embossing surface of said roll at each of said stations to form repetitive superimposed continuous embossments in the web at each station, said web comprising a material including at least two layers of cellulosic tissue which is stretchable and nonresilient at the pressures applied thereto at said embossing stations and an open-mesh web of crossed threads interposed between the layers of cellulosic tissue with at least the machine direction threads in the crossed-thread web being made of a material which is resilient at the pressures applied thereto at said embossing stations so that a substantially, constant web length is maintained between each pair of successive embossing stations, drawing the web away from the surface of said embossing roll after each embossing station and then returning the web to the surface of the embossing roll at the next embossing station so that the repetitive embossments formed in said web at successive embossing stations are offset from each other.

4. A method of forming two or more embossments in a flexible web using a single rigid metal embossing roll, said web including at least two layers of cellulosic tissue which is stretchable and nonresilient at the pressures applied thereto on said embossing roll and an open-mesh web of crossed threads interposed between the layers of cellulosic tissue with at least the machine direction threads in the crossed-thread web being made of a material which is resilient at the pressures applied thereto on said embossing roll, said method comprising the steps of continuously advancing the web into engagement with the single embossing roll where the web is pressed firmly and continuously against the embossing surface of said embossing roll to form a first repetitive continuous embossment in the web, continuously withdrawing the embossed web from said first embossing station and drawing the web away from the surface of said embossing roll, and continuously returning the embossed web to the surface of said single embossing roll and into engagement with said roll at a second embossing station where the web is again pressed firmly and continuously against the embossing surfaces of said roll to form a repetitive continuous embossment in the web, said second embossment being offset from and superimposed on said first embossment.

5. A method as set forth in claim 4 which includes the further steps of continuously withdrawing the embossed web from said second embossing station and drawing the web away from the surface of said embossing roll, and continuously returning the embossed web to the surface of said single embossing roll and into engagement with said roll at a third embossing station where the web is again pressed firmly against the surface of said roll to form a third continuous embossment in the web, said third embossment being offset from said first and second embossments.

6. Apparatus for forming two or more embossments in a flexible web, said apparatus comprising the combination of a single rigid metal embossing roll, a first resilient roller for continuously advancing the web into engagement with the single embossing roll at a first embossing station and pressing the web firmly against the surface of said embossing roll so that said roll continuously forms in said web a first continuous embossment in the web, a second resilient roller for continuously advancing the embossed web and pressing said web into engagement with said roll at a second embossing station where the web is again pressed firmly against the surface of said roll so that the same roll continuously forms in said web a second continuous embossment whereby the entire length of said web is doubly embossed, and means for continuously drawing the embossed web away from the surface of said embossing roll between said first and second embossing stations so that the embossment formed at said first and second embossing stations are offset from each other in the machine direction.

7. Apparatus as set forth in claim 6 which includes means for continuously withdrawing the embossed web from said second embossing station and drawing the web away from the surface of said embossing roll, and a third resilient roller for continuously returning the embossed web to the surface of said single embossing station where the web is again pressed firmly against the surface of said roll to form a third continuous embossment which is offset from said first and second embossments.